United States Patent [19]
Chowdhury

[11] Patent Number: 5,482,004
[45] Date of Patent: Jan. 9, 1996

[54] COLLAPSIBLE TEAT LINER WITH REINFORCED BARREL

[75] Inventor: Mofazzal H. Chowdhury, Lenexa, Kans.

[73] Assignee: Alfa Laval Agri, Inc., Kansas City, Mo.

[21] Appl. No.: 242,859

[22] Filed: May 16, 1994

[51] Int. Cl.⁶ ........................................ A01J 5/04
[52] U.S. Cl. ........................................ 119/14.52
[58] Field of Search ............................. 119/14.01, 14.02, 119/14.08, 14.5, 14.52, 14.54

[56] References Cited

U.S. PATENT DOCUMENTS

| | | | |
|---|---|---|---|
| D. 327,552 | 6/1992 | Lallerstedt | D30/99 |
| 473,770 | 4/1892 | Murchland . | |
| 650,572 | 5/1900 | Hussey . | |
| 827,159 | 7/1906 | Lane . | |
| 870,785 | 11/1907 | Jacques . | |
| 948,608 | 2/1910 | Andersen . | |
| 974,834 | 11/1910 | Sharples . | |
| 998,856 | 7/1911 | Mitchell . | |
| 1,073,538 | 9/1913 | Stephens . | |
| 1,201,808 | 10/1916 | Dinesen . | |
| 1,231,166 | 6/1917 | Jenkins . | |
| 1,236,413 | 8/1917 | Droutlege . | |
| 1,236,431 | 8/1917 | Hawley . | |
| 1,239,923 | 9/1917 | Leitch . | |
| 1,246,292 | 11/1917 | Macartney . | |
| 1,256,792 | 2/1918 | Harner . | |
| 1,260,466 | 3/1918 | Sharples . | |
| 1,307,929 | 6/1919 | Saunders . | |
| 1,337,211 | 4/1920 | Eklundh et al. . | |
| 1,388,380 | 8/1921 | Schmitt . | |
| 1,397,840 | 11/1921 | Maccartney . | |
| 1,425,584 | 8/1922 | Gessler . | |
| 1,476,788 | 12/1923 | Anderson . | |
| 1,513,189 | 10/1924 | Shippert | 119/14.47 |
| 1,538,731 | 5/1925 | Oden . | |
| 1,574,265 | 2/1926 | Sutherland . | |
| 1,657,667 | 9/1927 | Bruun . | |
| 1,700,025 | 1/1929 | Cockburn . | |
| 1,701,072 | 2/1929 | Hapgood . | |
| 1,705,292 | 3/1929 | Horthy et al. . | |

(List continued on next page.)

FOREIGN PATENT DOCUMENTS

| | | |
|---|---|---|
| 1400559 | 6/1988 | U.S.S.R. . |
| 285233 | 2/1928 | United Kingdom . |

OTHER PUBLICATIONS

Drawing of a Hi Life Rubber Inc. Narrow Bore Inflation for Use with Full View Shell dated Aug. 21, 1984.

*Primary Examiner*—Thomas Price
*Attorney, Agent, or Firm*—Hovey, Williams, Timmons & Collins

[57] ABSTRACT

Elongated, flexible teat cup liners (10) of improved design are provided which can accommodate teats of varying lengths without fear of teat damage or inefficient machine milking. The liners (10) of the invention include an apertured mouthpiece (12) adjacent one end thereof, with an elongated, intermediate barrel (14) presenting an inwardly collapsible teat-receiving region and a lowermost connecting tube (16) adapted for connection to a constant vacuum source. The liners (10) of the invention also include structure (18) for creating a differential resistance to inward collapse of the teat-receiving region of barrel (14) along the length thereof. The structure (18) assures a relatively high resistance to inward collapse at a first location (34) adjacent mouthpiece (12), and a gradual and progressive decrease in such resistance to inward collapse along an axial length of the teat-receiving region of barrel (14). Advantageously, the axial length of the teat-receiving region having the desired gradual and progressive decrease in resistance to inward collapse is at least three times greater than the maximum internal diameter of the teat-receiving region. The structure (18) may take the form of integral, circumferentially extending, axially spaced apart ribs (36) of differential mass, constant mass circumferential ribs (38) which are differentially spaced, a helical rib (40) of increasing pitch, or external, circumferentially spaced ribs (44) of decreasing mass from top to bottom.

16 Claims, 2 Drawing Sheets

U.S. PATENT DOCUMENTS

| | | |
|---|---|---|
| 1,705,293 | 3/1929 | Horthy et al. . |
| 1,816,116 | 7/1931 | Henrard . |
| 1,871,520 | 8/1932 | Henrard . |
| 1,896,321 | 2/1933 | Maes . |
| 1,916,839 | 7/1933 | Hulbert . |
| 1,935,184 | 11/1933 | Hapgood . |
| 1,955,810 | 4/1934 | Hodsdon . |
| 1,959,581 | 5/1934 | Hapgood . |
| 2,055,718 | 9/1936 | Davis . |
| 2,073,737 | 3/1937 | Ellison . |
| 2,079,435 | 5/1937 | Dinesen . |
| 2,099,884 | 11/1937 | Green . |
| 2,120,556 | 6/1938 | Greene . |
| 2,164,706 | 7/1939 | Flint et al. . |
| 2,219,945 | 10/1940 | Scott . |
| 2,302,443 | 11/1942 | Hodson . |
| 2,320,229 | 5/1943 | Frost . |
| 2,334,481 | 11/1943 | Da Silveira . |
| 2,402,094 | 6/1946 | Shurts et al. . |
| 2,408,390 | 10/1946 | Gessier . |
| 2,462,583 | 2/1949 | Welby . |
| 2,484,696 | 10/1949 | Dinesen . |
| 2,574,063 | 11/1951 | Richwine . |
| 2,621,626 | 12/1952 | Harris et al. . |
| 2,622,559 | 12/1952 | Luth . |
| 2,669,966 | 2/1954 | Skett . |
| 2,687,112 | 8/1954 | Shurts . |
| 2,694,379 | 11/1954 | Hein . |
| 2,744,496 | 5/1956 | Roben . |
| 2,853,971 | 9/1958 | Bajema . |
| 2,896,573 | 7/1959 | Schalm et al. . |
| 2,935,964 | 5/1960 | Pickavance et al. . |
| 2,944,514 | 7/1960 | Nesseth . |
| 2,947,262 | 8/1960 | Brown . |
| 2,986,117 | 5/1961 | Ronaldson . |
| 2,997,980 | 8/1961 | Noorlander . |
| 3,079,891 | 3/1963 | Miller . |
| 3,096,740 | 7/1963 | Noorlander . |
| 3,102,418 | 9/1964 | Schalm et al. . |
| 3,106,445 | 9/1964 | Cline . |
| 3,148,661 | 9/1964 | Lindsey . |
| 3,149,609 | 9/1964 | Noorlander . |
| 3,234,906 | 2/1966 | Jensen . |
| 3,272,179 | 9/1966 | Troberg . |
| 3,289,634 | 12/1966 | Simons . |
| 3,308,788 | 3/1967 | Noorlander . |
| 3,324,830 | 6/1967 | McAndrew . |
| 3,401,672 | 9/1968 | Berglind . |
| 3,474,769 | 10/1969 | Siddall et al. . |
| 3,476,085 | 11/1969 | Noorlander . |
| 3,485,212 | 12/1969 | McAndrew . |
| 3,550,557 | 12/1970 | Goldsmith . |
| 3,557,755 | 1/1971 | Close . |
| 3,589,194 | 6/1971 | Noorlander . |
| 3,611,993 | 10/1971 | Norton .................. 119/14.36 |
| 3,659,557 | 5/1972 | Noorlander ............ 119/14.36 |
| 3,659,558 | 5/1972 | Noorlander ............ 119/14.52 |
| 3,661,120 | 5/1972 | Siddall et al. ......... 119/14.49 |
| 3,696,790 | 10/1972 | Albright ............... 119/14.47 |
| 3,771,494 | 11/1973 | Mills ..................... 119/14.47 |
| 3,818,867 | 6/1974 | Strange-Hansen ...... 119/14.47 |
| 3,874,338 | 6/1974 | Happel .................. 119/14.53 |
| 3,931,795 | 1/1976 | Duncan ................. 119/14.38 |
| 3,934,550 | 1/1976 | Worstroff ............... 119/14.02 |
| 3,967,586 | 7/1976 | Noorlander ............ 119/14.53 |
| 3,967,587 | 7/1976 | Noorlander ............ 119/14.49 |
| 3,973,521 | 8/1976 | Duncan ................. 119/14.47 |
| 4,059,070 | 11/1977 | Siddall et al. ......... 119/14.47 |
| 4,116,165 | 9/1978 | Arrington .............. 119/14.47 |
| 4,141,319 | 2/1979 | Maier et al. ........... 119/14.47 |
| 4,196,696 | 4/1980 | Olander ................. 119/14.51 |
| 4,223,635 | 9/1980 | Akerman ............... 119/14.02 |
| 4,249,481 | 2/1981 | Adams .................. 119/14.02 |
| 4,269,143 | 5/1981 | Erbach .................. 119/14.49 |
| 4,280,446 | 7/1981 | Noorlander ............ 119/14.49 |
| 4,315,480 | 2/1982 | Noorlander ............ 119/14.45 |
| 4,320,718 | 3/1982 | Hoefelmayr et al. ... 119/14.49 |
| 4,332,215 | 6/1982 | Larson .................. 119/14.49 |
| 4,352,234 | 10/1982 | Noorlander .............. 29/450 |
| 4,372,250 | 2/1983 | Larson .................. 119/14.47 |
| 4,425,872 | 1/1984 | Mills ..................... 119/14.47 |
| 4,441,454 | 4/1984 | Happel et al. ......... 119/14.36 |
| 4,441,455 | 4/1984 | Lowry et al. .......... 119/14.47 |
| 4,457,272 | 7/1984 | Mills ..................... 119/14.47 |
| 4,459,938 | 7/1984 | Noorlander ............ 119/14.49 |
| 4,459,939 | 7/1984 | Noorlander ............ 119/14.49 |
| 4,483,272 | 11/1984 | Tonelli .................. 119/14.32 |
| 4,530,307 | 7/1985 | Thompson ............. 119/14.49 |
| 4,572,106 | 2/1986 | Mills ..................... 119/14.47 |
| 4,604,969 | 8/1986 | Larson . |
| 4,648,350 | 3/1987 | Noorlander ............ 119/14.32 |
| 4,651,676 | 3/1987 | Kupres .................. 119/14.47 |
| 4,756,275 | 7/1988 | Larson .................. 119/14.49 |
| 4,840,141 | 6/1989 | Marshall ................ 119/14.47 |
| 4,846,108 | 7/1989 | Meermoller ............ 119/14.47 |
| 4,941,433 | 7/1990 | Hanauer ................ 119/14.02 |
| 4,964,368 | 10/1990 | Ball et al. .............. 119/14.49 |
| 5,007,378 | 4/1991 | Larson .................. 119/14.47 |
| 5,069,162 | 12/1991 | Thompson et al. .... 119/14.47 |

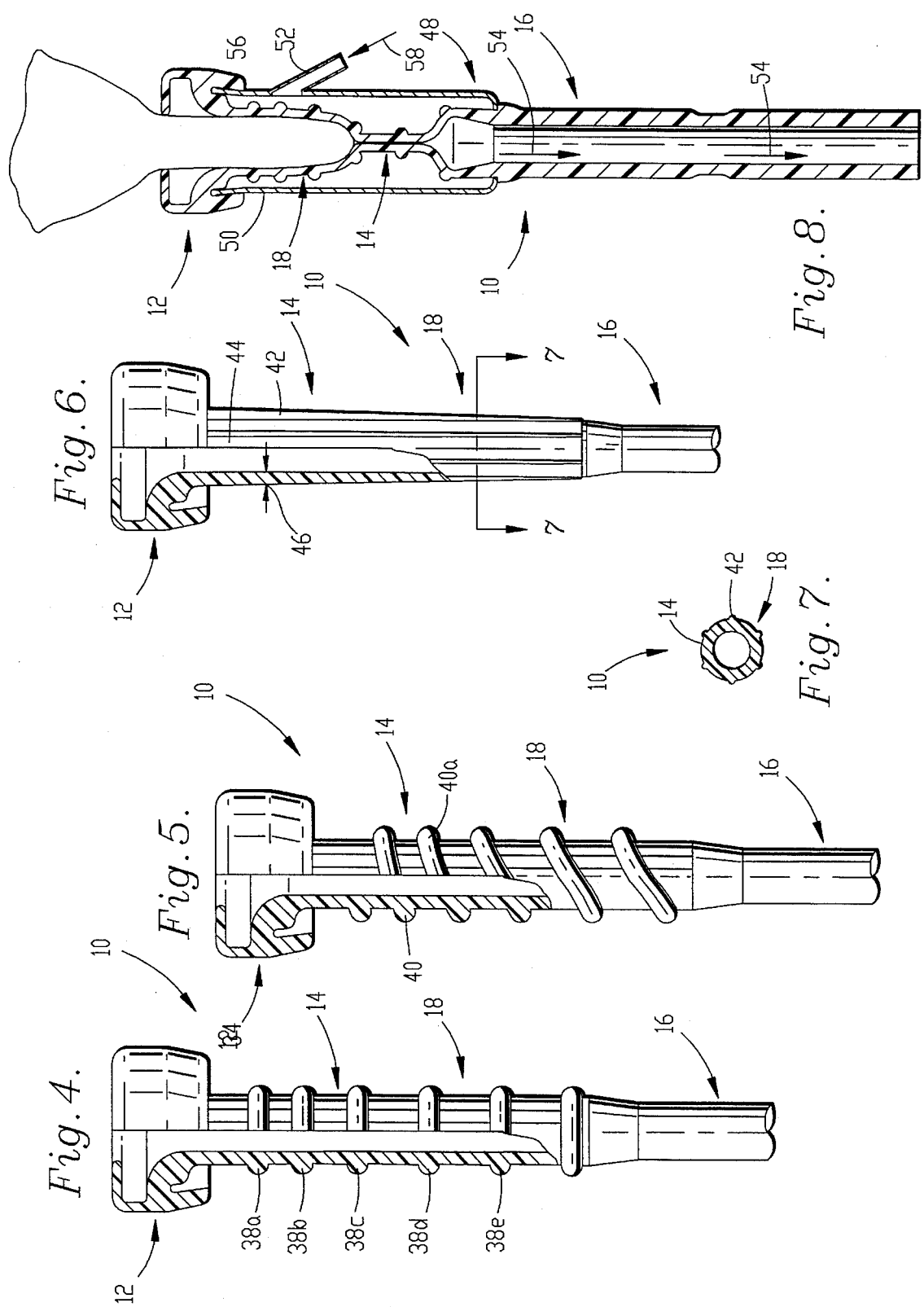

COLLAPSIBLE TEAT LINER WITH REINFORCED BARREL

BACKGROUND OF THE INVENTION

1. Field of the Invention

The present invention is broadly concerned with improved flexible teat cup inflations or liners used in automatic milking machines. More particularly, it is concerned with such teat cup liners which are specially designed to provide a differential resistance to inward collapse along the length of the teat-receiving region of the barrel of the liner; a maximum resistance to inward collapse is provided in the portion of the barrel adjacent the mouthpiece of the liner, which resistance gradually and progressively decreases along the axial length of the teat-receiving region. In this way, teats of varying lengths can be properly accommodated without fear of teat damage or chapping as a result of an improperly sized liner.

2. Description of the Prior Art

Conventional automatic milking machines utilize teat cup assemblies including a hollow, rigid outer shell or cup adapted to be attached to a pulsating vacuum line, with an elongated, flexible, resilient, tubular inflation or liner inserted within the shell and extending axially along the length thereof and coupled with a constant vacuum source. Typically, the liner includes an uppermost mouthpiece, a barrel including a teat-receiving region therein, and a short milk tube which extends downwardly to a milk claw for collecting milk from a plurality of teats. The mouthpiece and the end of the barrel adjacent the short milk tube make sealing engagement with the shell to form an annular vacuum chamber surrounding the barrel between the shell and liner. The pressure in this annular chamber is alternated between subatmospheric pressure and a higher pressure, typically atmospheric, by means of a pulsating vacuum line attached to the shell. The constant vacuum line connected via a milking claw to the normally lowermost short milk tube of the liner draws milk from the cow's teat. The interior of the liner is thus maintained at constant subatmospheric pressure, while the alternating pressure conditions in the annular chamber periodically cause inward collapse of the barrel wall of the liner, resulting in a massaging action on the teat. In addition, this periodic inward collapse of the barrel wall intermittently relieves the teat from exposure to the constant vacuum coupled with the lower end of the liner.

It is important that the upper portion or teat-receiving region of the liner grip the teat firmly to prevent vacuum loss and disengagement of the teat cup assembly from the teat. It is also well known that the teats of different cows vary considerably in diameter and length. Changes in teat sizes also occurs during the milking process. These variations in size make it very difficult to produce universal teat cup liners which can be used for milking of a wide variety of cows. This problem also accounts for the fact that a very large number of liner designs have been proposed in the past. Unfortunately, these designs have all been deficient in one or more respects, and the goal of a truly universal liner has heretofore eluded workers in the art.

A principal difficulty in producing a universal liner stems from the fact that virtually all prior designs are constructed so as to collapse at a predetermined intermediate region along the length of the barrel. While such a design may accommodate certain sizes of teats, cows having longer teats cannot properly be milked with these liners. Any attempt to use an improperly sized liner may lead to excessive teat cup crawl during milking, teat chapping and a tendency to induce mastitis.

U.S. Pat. No. 3,289,634 discloses a teat cup liner having upper and lower barrel sections of differential thickness, with the upper portion of the barrel being thicker. An abrupt step or shoulder is provided between the upper and lower regions of the liner barrel, which insures that collapse occurs at the lower, thinner region of the barrel. However, this design cannot properly accommodate teats of varying length. That is, while the design may be satisfactory for use on cows having teat lengths corresponding to the predetermined design, it may be totally useless or even damaging when used on cows having longer teats. Furthermore, this design is deficient in that it does not efficiently accommodate teat lengthening during the milking process. Similar constructions are described in U.S. Pat. Nos. 3,096,740 and 4,269, 143. In both of these patents, use is made of an externally applied sleeve disposed about the liner barrel. Each construction also includes a lower radial shoulder which engages the lower margins of the external sleeves, thereby insuring inward collapse of the liners at predetermined locations.

There is accordingly a decided need in the art for an improved teat cup liner which can properly receive teats of varying lengths, both initially and during the milking process, in order to permit efficient milking of a wide variety of cows while avoiding the problems inherent in improperly fitted teat cup liners.

SUMMARY OF THE INVENTION

The present invention overcomes the problems outlined above, and provides an elongated, flexible teat cup liner of truly universal design, which can accommodate milk animal teats of varying sizes. Broadly speaking, the teat cup liner of the invention includes the usual, normally uppermost apertured mouthpiece adjacent one end thereof, with an elongated, intermediate barrel presenting an inwardly collapsible, teat-receiving region, and with a connecting or short milk tube adjacent the other end of the liner adapted for connection with a vacuum source. The liner of the invention is improved by provision of means for creating a differential resistance to inward collapse of the teat-receiving region along the length thereof, with a relatively high resistance to inward collapse at a first location on the barrel adjacent the mouthpiece and a gradual and progressive decrease in such resistance to inward collapse along an axial length of the teat-receiving region of the barrel from the first location towards the connecting tube. This axial length having the desired gradual and progressive decrease in resistance to inward collapse is advantageously at least about three times greater than the maximum internal diameter of the teat-receiving region of the barrel. Thus, the liners of the present invention differ fundamentally from prior designs having structure which causes inward collapse only at a specific, predetermined location along the length of the barrel. That is to say, the liners of the present invention are collapsible at various locations as required for proper fit and milking, with pulsation-induced inward collapse of the liner always occurring below the lowermost end of the teat.

In preferred forms, the means for creating differential resistance to internal collapse takes the form of reinforcing structure integrally formed and unitary with the teat-receiving region of the barrel. Such reinforcing structure is typically mounted on the exterior surface of the teat-receiving region, and may include a plurality of axially extending, circumferentially spaced ribs having a greater mass at the first upper location and decreasing in mass along the axial length of the teat-receiving region. In practice, the ribs may have a maximum width at the upper first location and progressively narrow along the lengths of the teat-receiving region. In addition, these ribs advantageously have a radial thickness which is at maximum at the first location and becomes progressively smaller along the rib length.

In alternative forms, the reinforcing structure may comprise a plurality of axially spaced apart, circumferential rings on the exterior surface of the teat-receiving region. In order to provide the differential resistance to inward collapse in one form of the invention, the rings are of progressively decreasing mass, with the greatest mass ring being adjacent the first location; in this case, the rings are normally substantially evenly spaced along the axial length of the teat-receiving region. Alternately, each of the rings may have a substantially equal mass, in which event the axial spacing between adjacent rings increases from the first location and along the axial length of the teat-receiving region.

In a final preferred embodiment, the reinforcing structure comprises a continuous helical rib having an increasing pitch, i.e., the rib presents a series of convolutions with the axial spacing between the convolutions increasing from the first location and thence along the axial length of the teat-receiving region.

BRIEF DESCRIPTION OF THE DRAWINGS

FIG. 4 is a view similar to that of FIG. 3 illustrating an alternative design making use of constant mass circumferential rings wherein adjacent rings are differentially spaced apart along the barrel lengths;

FIG. 5 is a view similar to that of FIG. 4, but depicting the use of a single, continuous helical rib integral with the exterior surface of the liner barrel, and with the spacing between adjacent convolutions increasing along the barrel length;

FIG. 6 is a view partially in section and partially in elevation of another teat cup liner in accordance with the invention, wherein the liner includes reinforcing structure in the form of axially extending, circumferentially spaced external ribs of decreasing widths and radial thickness along the barrel length;

FIG. 7 is a sectional view taken along line 7—7 of FIG. 6 and further illustrating the spacing between external ribs; and FIG. 8 is a sectional view of a complete teat cup assembly including an external shell and a circumferentially ribbed liner in accordance with the invention, with the assembly mounted on a bovine teat and shown during a milking operation wherein the liner is in its collapsed condition.

DETAILED DESCRIPTION OF THE PREFERRED EMBODIMENTS

Figure 3:
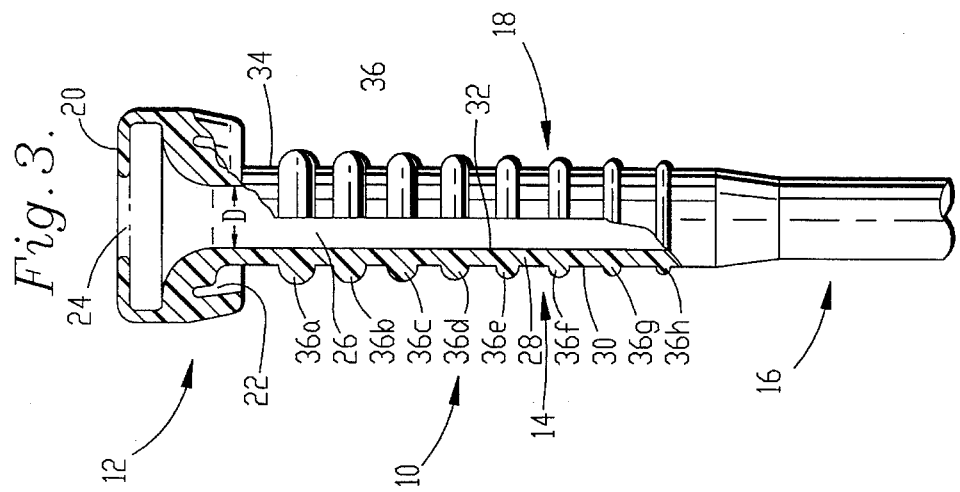
FIG. 3 is a view partially in vertical section and partially in elevation illustrating a teat cup liner in accordance with the invention, and having differently sized, substantially equally spaced external reinforcing rings integral with the exterior surface of the liner barrel to provide differential resistance to inward collapse along the barrel length.

Turning now to the drawings, and particularly FIG. 3, an elongated, flexible teat cup liner 10 is depicted. Broadly speaking, the liner includes an uppermost, apertured mouthpiece 12, an intermediate barrel 14 and a lowermost connecting tube 16. As shown, the liner 10 is integrally formed, typically of soft rubber material, and is equipped with reinforcing structure means broadly referred to by the numeral 18 for creating a differential resistance to inward collapse of the teat-receiving region of barrel 14.

In more detail, the mouthpiece 12 is of the usual design and includes an outermost, circumscribing lip 20 presenting a circular slot 22 adapted to receive the upper edge of a metallic teat cup. The mouthpiece 12 further presents a tapered opening 24 adapted to receive the teat of a cow.

The barrel 14 is in the form of an elongated, slightly tapered tubular section which is integral with mouthpiece 12 and has an inner bore 26 which is aligned and communicates with opening 24. As illustrated, the barrel 14 is defined by continuous wall structure 28, the latter presenting an exterior surface 30 and inner surface 32. Thus, the bore 26 has a maximum diameter D adjacent the upper end of barrel 14 proximal to mouthpiece 12. As those skilled in the art will appreciate, the barrel 14 defines along the length thereof a teat-receiving region which closely surrounds and engages a teat.

The connecting tube 16 is entirely conventional and is adapted for coupling to a constant vacuum source (not shown). It will also be appreciated that various types of connection structure can be provided as a part of the connecting tube 16, so as to afford a vacuum-tight coupling between the vacuum source and the connection tube.

As indicated, a prime advantage of the present invention resides in the fact that means 18 creates a differential resistance to inward collapse of the teat-receiving region of barrel 14. In particular, the reinforcing structure 18 creates a relatively high resistance to inward collapse at an upper location 34 proximal to mouthpiece 12, with a gradual and progressive decrease in this resistance along an axial length of the teat-receiving region of the barrel. In practice, this axial length having the gradual and progressive decrease in resistance to internal collapse should be at least about three times greater than the maximum internal diameter D described previously, and more preferably at least about four times the diameter D. Stated otherwise, the present invention seeks to avoid the drawback of prior teat cup liner designs wherein the tendency to inward collapse was focused at a localized, relatively small region intermediate the ends of the teat-receiving region of the barrel.

In the embodiment of FIG. 3, the means 18 takes the form of a plurality of radially outwardly extending annularly oriented (preferably arcuate) ribs 36 which are axially spaced along the teat-receiving region of barrel 14. In particular, it will be observed that the ribs 36 are integrally formed and unitary with the exterior surface of barrel 14, and moreover have differential masses. That is, the uppermost rib 36a has the greatest mass, and all succeeding ribs 36b, 36c, 36d, 36e, 36f, 36g, and 36h down the length of the barrel 14 have progressively smaller masses.

FIGS. 4–7 illustrate further embodiments in accordance with the present invention. These embodiments differ from that of FIG. 3 only in the particular structure and configuration of the means 18. Accordingly, a discussion of the common features of all of these embodiments vis-a-vis that of FIG. 3 will be omitted, and only the differences in the means 18 will be described in detail.

Turning first to FIG. 4, it will be seen that the means 18 includes circumferentially extending, axially spaced apart ribs 38 which are of substantially equal mass. In order to provide the desirable differential resistance to inward collapse, the axial spacing between adjacent ribs 38 increases from the uppermost rib 38a to the lowermost rib 38e.

In the case of FIG. 5, the means 18 includes an elongated, continuous, helical rib 40 formed integrally with the exterior surface of the barrel. The helical rib 40 presents a series of convolutions 40a along the length of the teat-receiving region of the barrel, with the axial spacing between these convolutions 40a increasing from top to bottom.

In FIGS. 6–7, the means 18 takes the form of a plurality of elongated, circumferentially spaced, axially extending, integral external ribs 42. Each of the ribs 42 has a greater mass at the first upper location adjacent the liner mouthpiece, with this mass decreasing along the axial length of the teat-receiving region of the barrel. In particular, it will be observed that each of the ribs 42 has a maximum width 44 adjacent the upper end of the liner barrel, which width decreases as the ribs extend towards the lower connecting tube. In addition, each of the ribs has a radial thickness 46 illustrated in the sectional showing of FIG. 6. This thickness likewise is at a maximum adjacent the upper end of the barrel proximal to the mouthpiece, with the radial thickness decreasing along the axial length of each of the ribs.

FIG. 8 illustrates a complete teat cup assembly 48. Specifically, the assembly 48 includes a conventional outer metallic teat cup 50 having a tubular connector 52, as well as a teat cup liner 10 in accordance with the invention (in the embodiment illustrated, the liner of FIG. 4 is depicted). As also shown, the tube 16 of the liner 10 is connected to a constant vacuum source, illustrated by arrows 54. The assembly 48 is shown during a milking operation, with the liner 10 receiving a bovine teat 56. As explained above, during normal milking operations, the pressure conditions within cup 50 and exterior to liner 10 are pulsated by the alternating entry of ambient air as indicated by arrow 58 in order to induce periodic inward collapse of the liner 10, as shown in FIG. 8. This periodic collapse provides proper massage for the teat 58. Proper collapse of the liner 10 normally prevents negative pressure from reaching the end of the teat so that the entire surface of the teat is isolated from exposure to the vacuum. Thus, the liner 10 does not close completely and the vacuum to the teat sinus is not discontinued during milking.

The means 18 affording differential resistance to inward collapse assures that the liner 10 can accommodate teats of all normal lengths and can also adjust to variations in teat lengths which occur during milking. This occurs because the liners of the invention more readily collapse adjacent connecting tube 16, and have an increasing resistance to internal collapse from the lower end of the barrel 14 upwardly toward mouthpiece 12. Thus, the teat-receiving region of the barrel 14 collapse inwardly from "bottom up" and around the tip of the teat whatever its position within the barrel to thereby accommodate virtually all teat lengths. Specifically avoided is a situation where the liner collapse at a predetermined region or zone along the length of the barrel 14.

Figure 2:
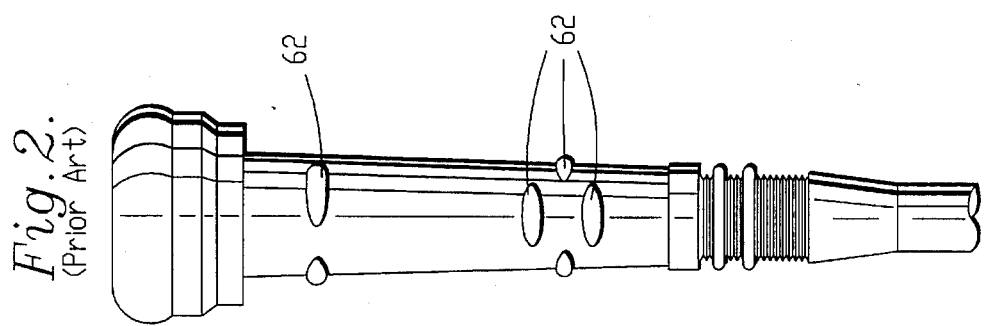
FIG. 2 is an elevational view of another prior art liner having two clusters of axially spaced apart external reinforcing nibs on the barrel wall thereof.
Figure 1:
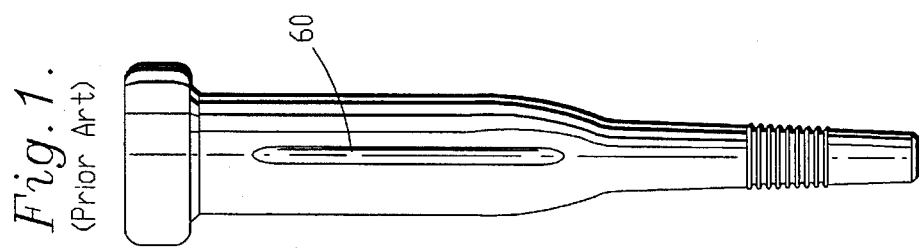
FIG. 1 is an elevational view illustrating a prior art teat cup liner design, equipped with axially extending, constant mass ribs on the exterior surface of the liner barrel.

Turning to FIGS. 1 and 2, the essential difference between the liners of the present invention and those of the prior art can be readily seen. In the prior art designs illustrated in FIGS. 1 and 2, external reinforcing structure in the form of constant mass ribs 60 (FIG. 1) or external, axially spaced apart nib clusters 62 (FIG. 2) are provided. In each of these designs, however, no gradual and progressive decrease in resistance to inward collapse from top to bottom is provided. As a consequence, these designs cannot properly accommodate varying teat lengths and are therefore deficient.

I claim:

1. In an elongated, flexible teat cup liner having an apertured mouthpiece adjacent one end thereof, an elongated, intermediate barrel presenting an elongated, inwardly collapsible, teat-receiving region having an axial length and a maximum internal diameter, and a connecting tube adjacent the other end the other end thereof adapted for connection with a vacuum source, the improvement which comprises means for creating a differential resistance to said inward collapse of said teat-receiving region along the axial length thereof, with a relatively high resistance to inward collapse at a first location adjacent said mouthpiece and a gradual and progressive decrease in said resistance to inward collapse along an axial length of the teat-receiving region from said first location towards said connecting tube, said axial length of said teat-receiving region having said gradual and progressive decrease in said resistance to inward collapse having a dimension at least about three times greater than said maximum internal diameter of said teat-receiving region.

2. A teat cup liner as set forth in claim 1, said differential resistance-creating means being adjacent to said teat-receiving region and extending along said axial length.

3. A teat cup liner as set forth in claim 2, said differential resistance-creating means being integrally formed and unitary with said teat-receiving region of said barrel.

4. A teat cup liner as set forth in claim 1, said differential resistance-creating means comprising reinforcing structure mounted on the exterior surface of said teat-receiving region.

5. A teat cup liner as set forth in claim 4, wherein said reinforcing structure is integrally formed and unitary with said exterior surface.

6. A teat cup liner as set forth in claim 4, wherein said reinforcing structure is substantially aligned with the longitudinal axis of said teat-receiving region.

7. A teat cup liner as set forth in claim 6, wherein said reinforcing structure comprises a plurality of axially extending ribs having a greater mass at said first location and decreasing in mass along said axial length.

8. A teat cup liner as set forth in claim 7, wherein said ribs have a maximum width at said first location and progressively narrow along said axial length.

9. A teat cup liner as set forth in claim 7, said ribs extending radially outwardly from said exterior surface to define the radial thicknesses thereof, said ribs having their maximum radial thickness adjacent said first location and progressively smaller radial thicknesses along said axial length.

10. A teat cup liner as set forth in claim 4, said reinforcing structure comprising a plurality of axially spaced apart, circumferential rings.

11. A teat cup liner as set forth in claim 10, said rings being of progressively decreasing mass along said axial length with the ring of greatest mass being adjacent said first location.

12. A teat cup liner as set forth in claim 11, said rings being substantially evenly spaced along said axial length.

13. A teat cup liner as set forth in claim 10, said rings each having substantially equal masses with the axial spacing between adjacent rings increasing from said first location and along said axial length.

14. A teat cup liner as set forth in claim 10, said rings being integrally formed and unitary with said exterior surface.

15. A teat cup liner as set forth in claim 4, said reinforcing structure comprising a continuous helical rib presenting a series of convolutions along said axial length, the axial spacing between said convolutions increasing from said first location and along said axial length.

16. A teat cup liner as set forth in claim 15, said helical rib being integrally formed and unitary with said exterior surface.

* * * * *